US010873375B2

(12) United States Patent
Onggosanusi et al.

(10) Patent No.: US 10,873,375 B2
(45) Date of Patent: Dec. 22, 2020

(54) PRE-CODER SELECTION BASED ON RESOURCE BLOCK GROUPING

(71) Applicant: Texas Instruments Incorporated, Dallas, TX (US)

(72) Inventors: Eko N. Onggosanusi, Allen, TX (US); Badri Varadarajan, Mountain View, CA (US); Anand Ganesh Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1087 days.

(21) Appl. No.: 13/765,233

(22) Filed: Feb. 12, 2013

(65) Prior Publication Data

US 2014/0226739 A1 Aug. 14, 2014
US 2018/0351613 A9 Dec. 6, 2018
US 2019/0393935 A9 Dec. 26, 2019

Related U.S. Application Data

(62) Division of application No. 11/688,756, filed on Mar. 20, 2007, now Pat. No. 10,044,532.

(Continued)

(51) Int. Cl.
*H04B 7/04* (2017.01)
*H04B 7/0456* (2017.01)
(Continued)

(52) U.S. Cl.
CPC ........ *H04B 7/0456* (2013.01); *H04L 25/0228* (2013.01); *H04L 27/2626* (2013.01); *H04L 27/2647* (2013.01)

(58) Field of Classification Search
CPC ............................ H04L 5/0007; H04B 7/0478
(Continued)

(56) References Cited

U.S. PATENT DOCUMENTS 7,251,768 B2 * 7/2007 Giannakis ............. H03M 13/29
375/262
7,899,421 B2 * 3/2011 Zheng .................. H04B 7/0697
370/334

(Continued)

*Primary Examiner* — Patrick N Edouard
*Assistant Examiner* — Eboni N Giles
(74) *Attorney, Agent, or Firm* — Gregory J. Albin; Charles A. Brill; Frank D. Cimino

(57) ABSTRACT

The present invention provides a receiver. In one embodiment, the receiver includes a receive portion employing transmission signals from a transmitter having multiple antennas and capable of providing channel estimates. The receiver also includes a feedback generator portion configured to provide to the transmitter a pre-coder selection for data transmission that is based on the channel estimates, wherein the pre-coder selection corresponds to a grouping of frequency-domain resource blocks. The present invention also provides a transmitter having multiple antennas. In one embodiment, the transmitter includes a transmit portion coupled to the multiple antennas and capable of applying pre-coding to a data transmission for a receiver. The transmitter also includes a feedback decoding portion configured to decode a pre-coder selection for the data transmission that is fed back from the receiver, wherein the pre-coder selection corresponds to a grouping of frequency-domain resource blocks.

20 Claims, 4 Drawing Sheets

Related U.S. Application Data

(60) Provisional application No. 60/784,210, filed on Mar. 20, 2006.

(51) Int. Cl.
  *H04L 25/02* (2006.01)
  *H04L 27/26* (2006.01)

(58) Field of Classification Search
  USPC .................. 375/219; 370/252, 329, 330
  See application file for complete search history.

(56) References Cited

U.S. PATENT DOCUMENTS

| | | | |
|---|---|---|---|
| 8,639,190 B2* | 1/2014 | Gore | H04L 1/0016 375/146 |
| 2003/0148770 A1 | 8/2003 | Das et al. | |
| 2005/0002468 A1 | 1/2005 | Walton et al. | |
| 2005/0201295 A1* | 9/2005 | Kim | H04L 1/0026 370/241 |
| 2006/0029157 A1* | 2/2006 | Dabak | H04B 7/0417 375/299 |
| 2006/0039489 A1* | 2/2006 | Ikram | H04B 7/0634 375/260 |
| 2006/0039499 A1 | 2/2006 | Chae et al. | |
| 2006/0040645 A1 | 2/2006 | Grilli et al. | |
| 2006/0056534 A1 | 3/2006 | Ionescu et al. | |
| 2006/0098754 A1* | 5/2006 | Kim | H04B 7/0426 375/267 |
| 2007/0177681 A1 | 8/2007 | Choi et al. | |
| 2007/0211813 A1* | 9/2007 | Talwar | H04B 7/0417 375/267 |
| 2007/0217540 A1* | 9/2007 | Onggosanusi | H04B 7/0417 375/267 |
| 2007/0242770 A1* | 10/2007 | Kim | H04L 1/0026 375/267 |
| 2007/0280360 A1* | 12/2007 | Ihm | H04B 7/0854 375/259 |
| 2008/0013610 A1* | 1/2008 | Varadarajan | H04B 7/0417 375/221 |
| 2008/0037675 A1* | 2/2008 | Lin | H04B 7/0417 375/262 |
| 2008/0049709 A1* | 2/2008 | Pan | H04B 7/0634 370/344 |
| 2008/0207135 A1* | 8/2008 | Varadarajan | H04L 1/0029 455/69 |
| 2008/0273618 A1* | 11/2008 | Forenza | H04B 7/022 375/261 |
| 2008/0273624 A1* | 11/2008 | Kent | H04B 7/0632 375/296 |
| 2008/0292013 A1* | 11/2008 | Varadarajan | H04B 7/0417 375/260 |
| 2009/0046569 A1* | 2/2009 | Chen | H04L 1/0029 370/203 |
| 2009/0067518 A1* | 3/2009 | Melis | G06F 17/17 375/260 |
| 2009/0141648 A1* | 6/2009 | Imamura | H04L 1/0016 370/252 |
| 2009/0262653 A1* | 10/2009 | Toda | H04L 1/0026 370/252 |
| 2010/0110982 A1* | 5/2010 | Roh | H04B 7/0417 370/328 |
| 2012/0236752 A1* | 9/2012 | Hu et al. | 370/252 |
| 2013/0064207 A1* | 3/2013 | Wang et al. | 370/329 |
| 2013/0201912 A1* | 8/2013 | Sheng et al. | 370/328 |
| 2013/0294488 A1* | 11/2013 | Pan et al. | 375/219 |
| 2013/0329675 A1* | 12/2013 | Dinan | 370/329 |

* cited by examiner

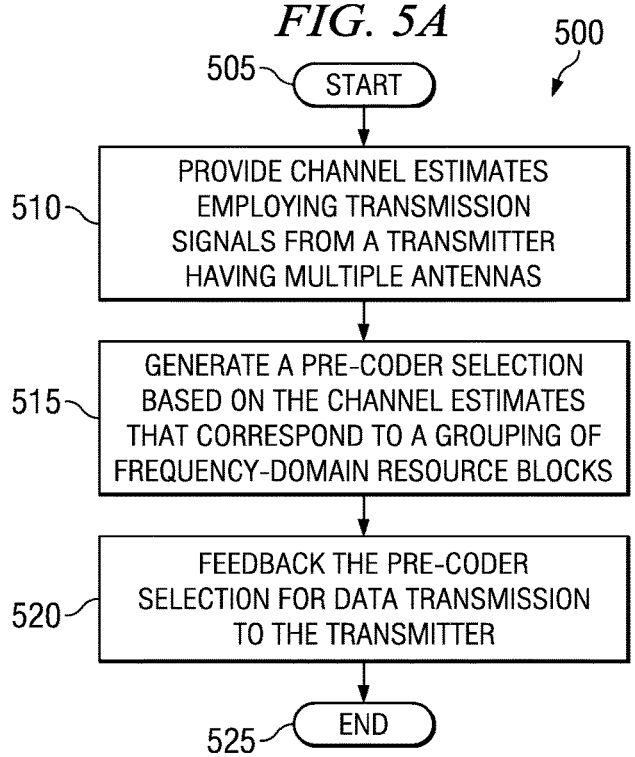
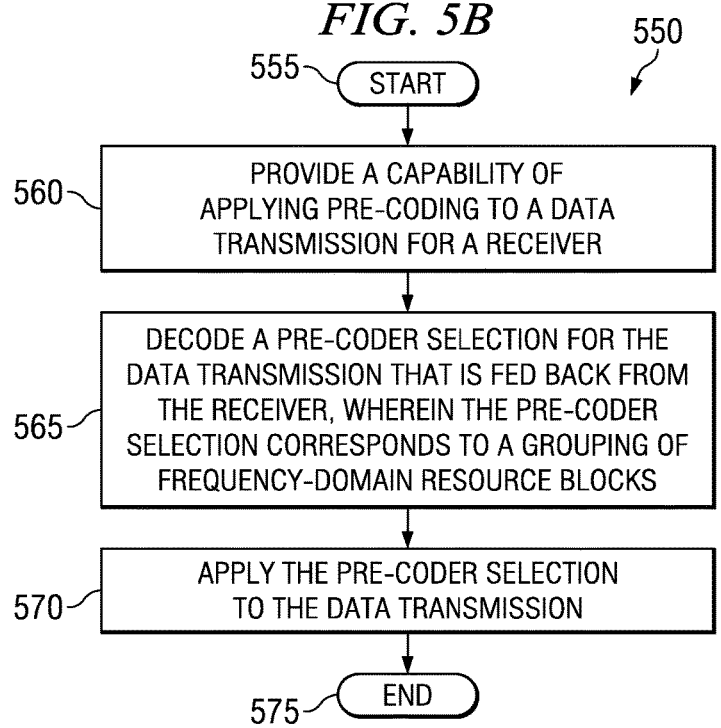

PRE-CODER SELECTION BASED ON RESOURCE BLOCK GROUPING

CROSS-REFERENCE TO PROVISIONAL APPLICATIONS

This application is a divisional of prior application Ser. No. 11/688,756, filed Mar. 20, 2007, which claims the benefit of U.S. Provisional Application No. 60/784,210 entitled "Evaluation of Downlink MIMO Pre-coding for E-UTRA with 2-Antenna Node B" to Eko N. Onggosanusi, Badri Varadarajan and Anand G. Dabak filed on Mar. 20, 2006, and which further claims the benefit of U.S. Provisional Application No. 60/884,350, filed Jan. 10, 2007, all of which are incorporated herein by reference in their entirety.

Additionally, this application claims the benefit of U.S. Provisional Application No. 60/884,350 entitled "Feedback Reduction for CL MIMO" to Eko N. Onggosanusi, Badri Varadarajan and Anand G. Dabak filed on Jan. 10, 2007, which is incorporated herein by reference in its entirety.

TECHNICAL FIELD OF THE INVENTION

The present invention is directed, in general, to wireless communications and, more specifically, to a receiver and a transmitter and methods of operating a receiver and a transmitter.

BACKGROUND OF THE INVENTION

In a cellular network, such as one employing orthogonal frequency division multiplexing (OFDM) or orthogonal frequency division multiple access (OFDMA), each cell employs a base station that communicates with user equipment, such as a cell phone, a laptop, or a PDA, which is actively located within its cell.

Initially, the base station transmits reference signals (synonymous to pilot signals) to the user equipment wherein the reference signals are basically an agreement between the base station and the user equipment that at a certain frequency and time, they are going to receive a known signal. Since the user equipment knows the signal and its timing, it can generate a channel estimate based on the reference signal. Of course, there are unknown distortions such as interference and noise, which impact the quality of the channel estimate.

In an OFDM or OFDMA system, different user equipments are scheduled on different portions of the system bandwidth. The system bandwidth may be divided into frequency-domain resource blocks of a certain size (sometime referred as sub-band) wherein a resource block is the smallest allocation unit available in terms of frequency granularity that can be allocated to user equipment. Each resource block consists of $N_{RB}$ contiguous OFDM/OFDMA sub-carriers. While the size of different resource blocks can in general vary, it is preferred to impose the same size across resource blocks. Otherwise, the resource blocks size shall be as uniform as possible across the system bandwidth. A different user could potentially go on each of these resource blocks. In addition, a user can be scheduled on a portion of the system bandwidth having adjacent resource blocks inside. Non-adjacent allocation for each user is also possible.

The user equipment determines a channel quality indicator (CQI) for each of the resource blocks based on the channel estimation performed. The CQI employed can be a signal to interference noise ratio (SINR) after detection. The CQI can also be a certain type of quality measure such as mutual information. Other types of CQI that reflect the quality of transmission channel are also possible. Furthermore, the CQI for different resource blocks can also be jointly encoded and compressed. The user equipment feeds back the CQI for each resource block to the base station. A higher CQI for a resource block allows a higher data rate transfer of information from the base station to the user equipment.

For systems with multiple transmit and multiple receive antennas (also termed as multi-input multi-output (MIMO) systems), improved throughput and/or robustness can be obtained by employing transmit pre-coding. To apply a pre-coding on a MIMO system means that a certain transformation (typically linear) is applied to the data stream(s) prior to transmission via physical antennas. The number of independent data streams is termed the transmission rank. With pre-coding, the number of physical antennas does not have to be equal to the transmission rank. In this case, the pre-coder is a P×R matrix, where P is the number of physical transmit antennas and R is the transmission rank. Denoting the pre-coder matrix as W and the R independent data streams as an R-dimensional vector s, the transmitted signal via the P physical antennas can be written as: x=Ws.

Depending on the duplexing scheme, the pre-coder matrix W can be selected at the transmitter or receiver. For an FDD system where the uplink and downlink channels are not reciprocal, the pre-coder matrix W is more efficiently chosen at the receiver (user equipment) from a finite pre-determined set of matrices, termed the pre-coding codebook. Based on the channel estimate, the user equipment determines the pre-coder selection corresponding to the CQI in each resource block that is needed to allow an optimization of data throughput, for example. Therefore, the pre-coder is also a function of the channel and its quality. The same codebook-based pre-coding scheme can also be used for TDD or half-duplex TDD/FDD.

Once this is done, the user equipment will feed back to the base station for each of its resource blocks, the pre-coder and the CQI that will be achieved if that pre-coder is used for the resource block in the transmission of data. For example, in the context of the 3GPP E-UTRA system deploying a 5-MHz transmission, 10 user equipments having feedback information pertaining to 25 resource blocks requires that 250 units of information be fed back to the base station, just to schedule them. This requires a high level of operational overhead information.

In addition to the CQI and pre-coder selection feedback, the user equipment shall also select and feed back the transmission rank. While transmission rank selection may or may not be performed for each resource block, this constitutes to additional feedback overhead.

Accordingly, what is needed in the art is an enhanced way to reduce the amount of initial feedback required between user equipment and base station.

SUMMARY OF THE INVENTION

To address the above-discussed deficiencies of the prior art, the present invention provides a receiver. In one embodiment, the receiver includes a receive portion employing transmission signals from a transmitter having multiple antennas and capable of providing channel estimates. The receiver also includes a feedback generator portion configured to provide to the transmitter a pre-coder selection for data transmission that is based on the channel estimates, wherein the pre-coder selection corresponds to a grouping of frequency-domain resource blocks. Pre-coder selection per group of resource blocks is motivated with the fact that the pre-coding codebook size is typically kept to a minimum, and hence, the optimum pre-coder tends to stay the same across multiple resource blocks.

The present invention also provides a transmitter having a plurality of antennas. In one embodiment, the transmitter includes a transmit portion coupled to the plurality of antennas and capable of applying pre-coding to a data transmission for a receiver. The transmitter also includes a feedback decoding portion configured to decode a pre-coder selection for the data transmission that is fed back from the receiver, wherein the pre-coder selection corresponds to a grouping of frequency-domain resource blocks. The grouping scheme that is used at the transmitter corresponds to the grouping scheme that is used at the receiver.

In another aspect, the present invention provides a method of operating a receiver. In one embodiment, the method includes providing channel estimates employing transmission signals from a transmitter having multiple antennas. The method also includes feeding back a pre-coder selection for data transmission to the transmitter that is based on the channel estimates, wherein the pre-coder selection corresponds to a grouping of frequency-domain resource blocks.

The present invention also provides a method of operating a transmitter having a plurality of antennas. In one embodiment, the method includes extracting a pre-coder selection provided by a feedback signal from a receiver, wherein the pre-coder selection corresponds to a grouping of frequency-dependent resource blocks and applying the pre-coder selection to data to be transmitted to the receiver based on decoded information corresponding to the pre-coder selection.

BRIEF DESCRIPTION OF THE DRAWINGS

For a more complete understanding of the present invention, reference is now made to the following descriptions taken in conjunction with the accompanying drawings, in which:

FIG. 5A illustrates a flow diagram of an embodiment of a method of operating a receiver carried out according to principles of the present invention; and FIG. 5B illustrates a flow diagram of an embodiment of a method of operating a transmitter having multiple antennas carried out according to principles of the present invention.

DETAILED DESCRIPTION

Figure 1A:
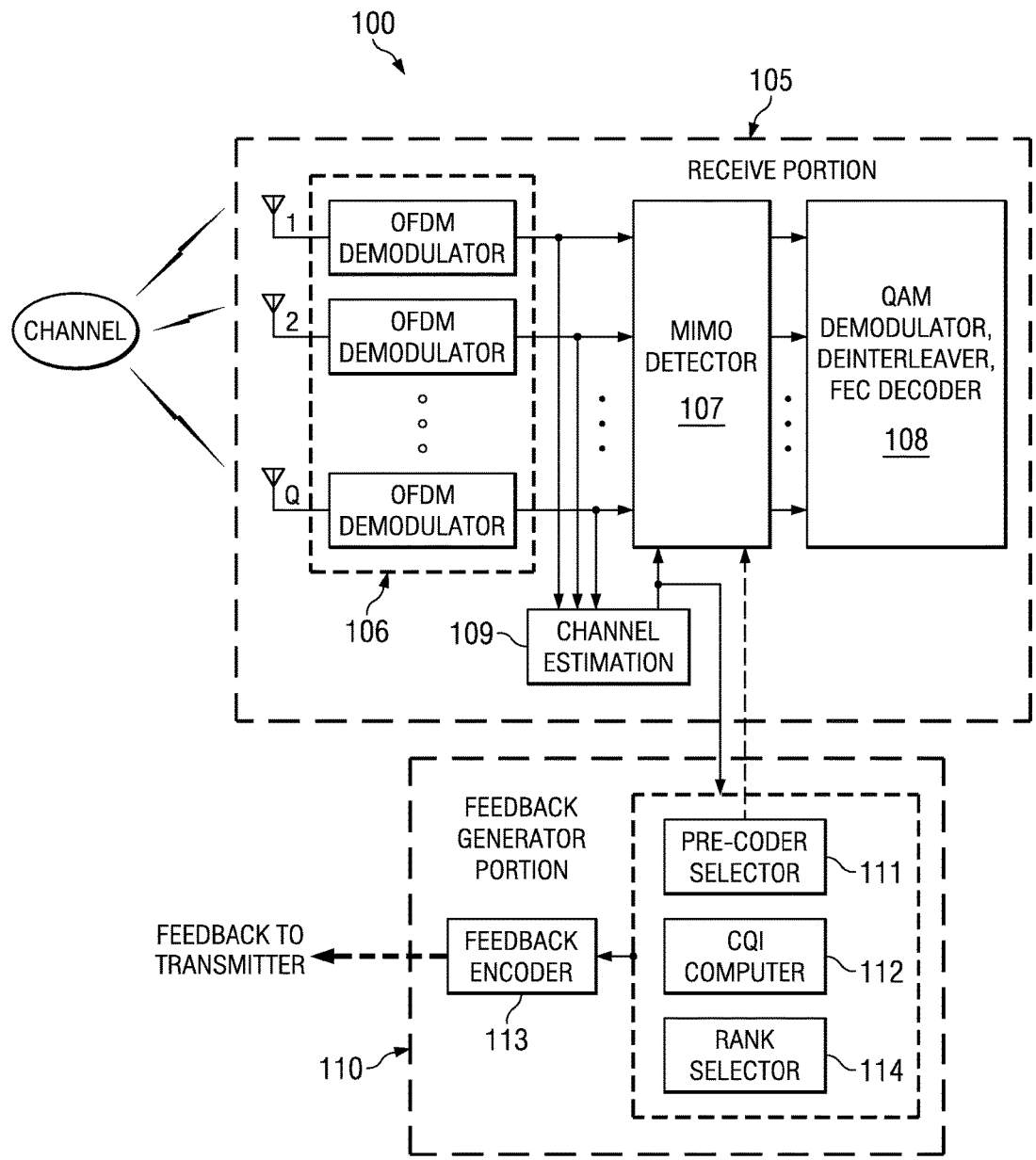
FIG. 1A illustrates a system diagram of a receiver as provided by one embodiment of the present invention.

FIG. 1A illustrates a system diagram of a receiver 100 as provided by one embodiment of the present invention. In the illustrated embodiment, the receiver 100 operates in an OFDM communications system. The receiver 100 includes a receive portion 105 and a feedback generation portion 110. The receive portion 105 includes an OFDM module 106 having Q OFDM demodulators (Q is at least one) coupled to corresponding receive antenna(s), a MIMO detector 107, a QAM demodulator plus de-interleaver plus FEC decoding module 108 and a channel estimation module 109. The feedback portion 110 includes a pre-coder selector 111, a channel quality indicator (CQI) computer 112, rank selector 114, and a feedback encoder 113.

The receive portion is primarily employed to receive data from a transmitter based a pre-coder selection that was determined by the receiver and feedback to the transmitter. The OFDM module 106 demodulates the received data signals and provides them to the MIMO detector 107, which employs channel estimation and pre-coder information to further provide the received data to the module 108 for further processing (namely QAM demodulation, de-interleaving, and FEC decoding). The channel estimation module 109 employs previously transmitted channel estimation signals to provide the channel estimates need by the receiver 100. The pre-coder information can be obtained via an additional downlink signaling embedded in the downlink shared control channel or in a dedicated reference signal. Alternatively, the receiver 100 can obtain the pre-coder information from the previously selected pre-coder. In addition, the two sources can also be used in conjunction to further improve the accuracy.

The pre-coder selector 111 determines the pre-coder selection for the data transmission based on the channel estimates and the CQI information provided by the CQI computer 112. These pre-coder selection and CQI are computed for the next time the user equipment is scheduled by the transmitter (e.g., a base station) to receive data. The feedback encoder 113 then encodes the pre-coder selection and the CQI information and feeds it back to the transmitter before the data is transmitted. In one embodiment, the pre-coder selection is jointly encoded to achieve feedback transmission compression. For improved efficiency, the pre-coder selection and CQI can be jointly encoded into one codeword.

The pre-coder selection corresponds to a grouping of frequency-domain resource blocks employed by the receiver 100. In the illustrated embodiment, the pre-coder selection provides a single pre-coder for each group of contiguous resource blocks. Alternatively, the pre-coder selection may provide a set of pre-coders corresponding to a subgroup of resource blocks contained in each group of contiguous resource blocks. Additionally, the pre-coder selection may provide a set of pre-coders corresponding to a combination of groups of contiguous resource blocks.

Actual selection of the pre-coders depends on an "optimality criterion". A typical optimality criterion may be related to the sum throughput that a group of resource blocks provides. Alternatively, a worst case throughput or a specified maximum error rate for the group of resource blocks may be employed. Of course, one skilled in the pertinent art will recognize that there may be other current or future developed optimality criteria applicable to the present invention.

The grouping of the resource blocks may be variable or fixed depending of a level of signaling support available. For example, the grouping may vary depending on the channel quality afforded by the resource blocks involved. Or, the grouping may be fixed if the channel quality is high for the resource blocks involved. Those are only some examples for the faster variation. Slower variation can also be employed. For example, the group size (the number of contiguous resource blocks within each group) is fixed only throughout the entire communication session, or within each data frame. For faster variation, the downlink shared control channel can be used to communicate the change in the grouping scheme. The slower variation can benefit from the downlink broadcast (common control) channel, which is transmitted less frequently, or higher layer signaling.

In general, the grouping scheme or the group size is configurable by the network and/or the transmitter (base station). It is also, possible, however, for the receiver (user equipment) to request the transmitter and/or the network for changing the grouping scheme/size. This request can be conveyed via a low-rate feedback (e.g., sparse physical layer feedback or higher layer feedback signaling). This is relevant when the downlink interference characteristic is highly frequency selective.

Figures 1B, 2:
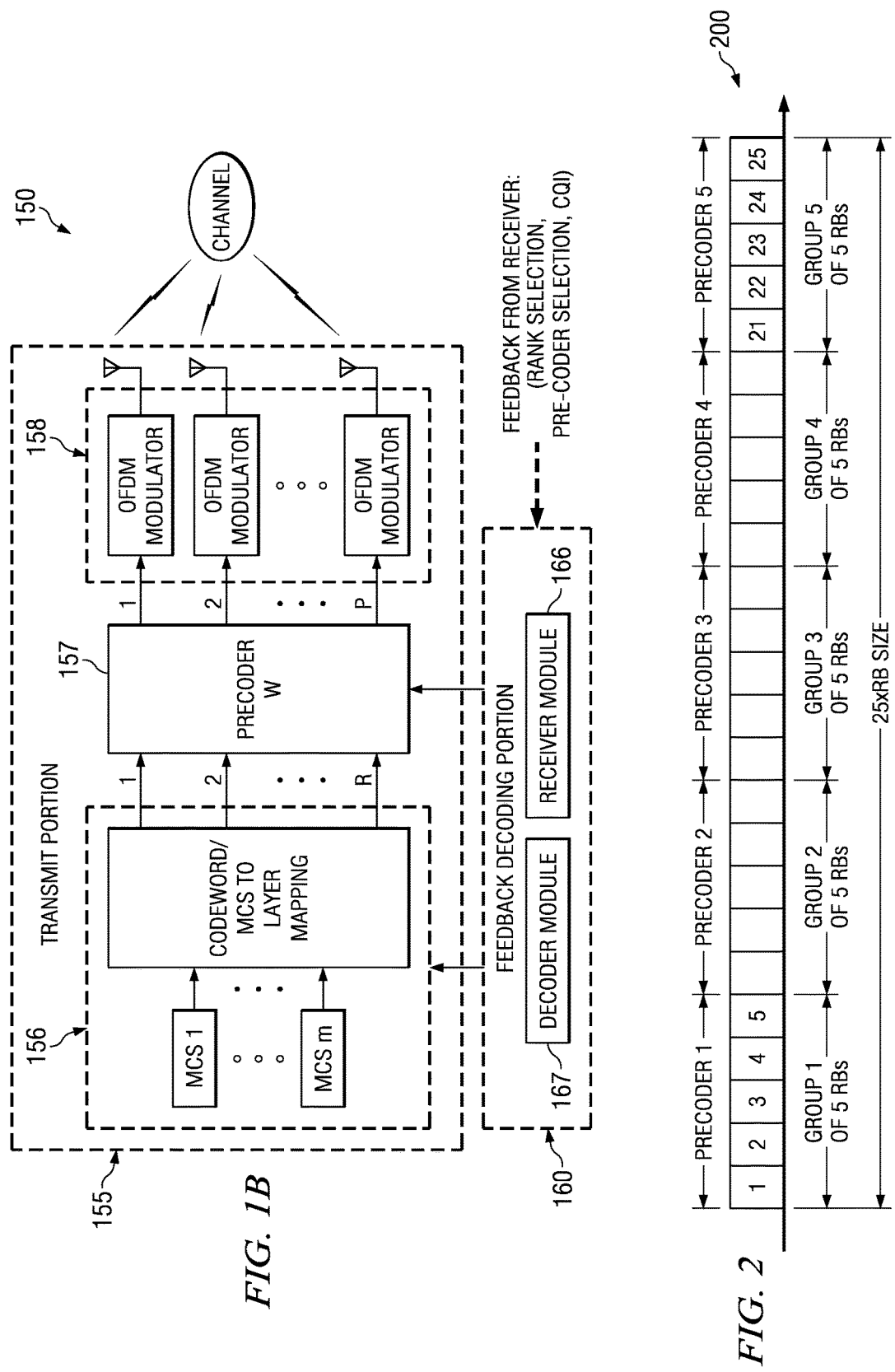
FIG. 1B illustrates a system diagram of a transmitter as provided by one embodiment of the present invention.
FIG. 2 illustrates a diagram of an exemplary grouping of resource blocks as provided by one embodiment of the present invention.

FIG. 1B illustrates a system diagram of a transmitter ISO as provided by one embodiment of the present invention. In the illustrated embodiment, the transmitter operates in an OFDM communication system. The transmitter 150 includes a transmit portion 155 and a feedback decoding portion 160. The transmit portion 155 includes a modulation and coding scheme module 156, a pre-coder module 157 and an OFDM module 158 having multiple OFDM modulators that feed corresponding transmit antennas. The feedback decoding portion 160 includes a receiver module 166 and a decoder module 167.

The transmit portion 155 is employed to transmit data provided by the MCS module 156 to a receiver based on pre-coding provided by the pre-coder module 157. The MCS module 156 takes m codewords (m is at least one) and maps the codeword(s) to the R layers or spatial streams, where R is the number of transmission ranks and at least one. Each codeword consists of FEC-encoded, interleaved, and modulated information bits. The selected modulation and coding rate for each codeword are derived from the CQI. A higher CQI implies that a higher data rate may be used. The pre-coder module 157 employs a pre-coder selection obtained from the feedback decoding portion 160, wherein the pre-coder selection corresponds to a grouping of frequency-domain resource blocks employed by the receiver. The receiver module 166 accepts the feedback of this pre-coder selection, and the decoder module 167 provides them to the pre-coder module 157.

Once the R spatial stream(s) are generated from the MCS module 156, a pre-coder is applied to generate P≥R output streams. Note that P can be equal to R only if R>1 since P>1 and R≥1. The pre-coder W is selected from a finite predetermined set of possible linear transformations or matrices, which corresponds to the set that is used by the receiver. Using pre-coding, the R spatial stream(s) are cross-combined linearly into P output data streams. For example, if there are 16 matrices in the pre-coding codebook, a pre-coder index corresponding to one of the 16 matrices for the resource block (say 5, for example) may be signaled from the receiver to the transmitter for each group of resource blocks. The pre-coder index then tells the transmitter 150 which of the 16 matrices to use.

FIG. 2 illustrates a diagram of an exemplary grouping of resource blocks 200 as provided by one embodiment of the present invention. The grouping of resource blocks 200 includes five groups of five frequency-domain resource blocks wherein a pre-coder selection provides a single pre-coder for each group, as shown. In the context of the 3GPP E-UTRA, each of the resource blocks represents 180 kHz of bandwidth (consisting of 12 OFDM/OFDMA sub-carriers) thereby giving a group size of 900 kHz for each of first, second and third pre-coders selected. This grouping may provide a practical grouping size for many applications.

Figure 3A:
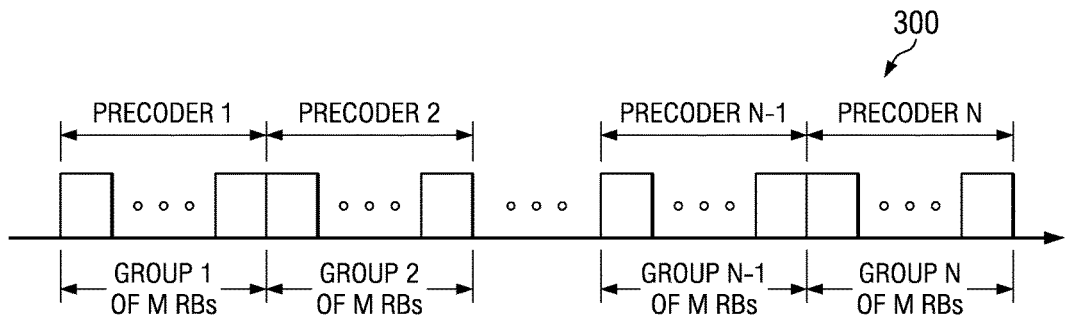
FIG. 3A illustrates a diagram of a more generalized grouping of resource blocks corresponding to the exemplary grouping of FIG. 2.
Figure 3B:
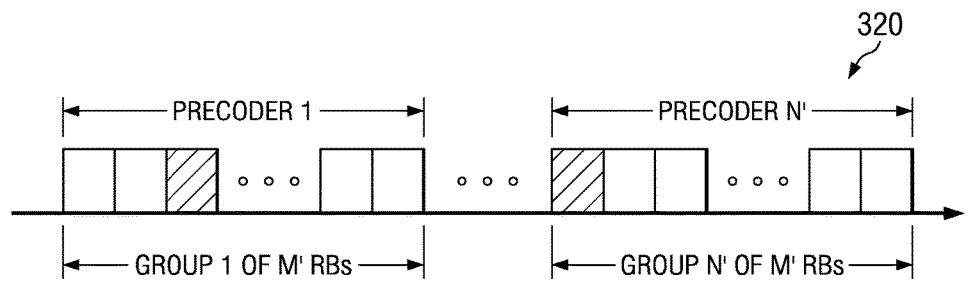
FIG. 3B illustrates a diagram of a grouping of resource blocks as provided by an alternative embodiment of the present invention.
Figure 3C:
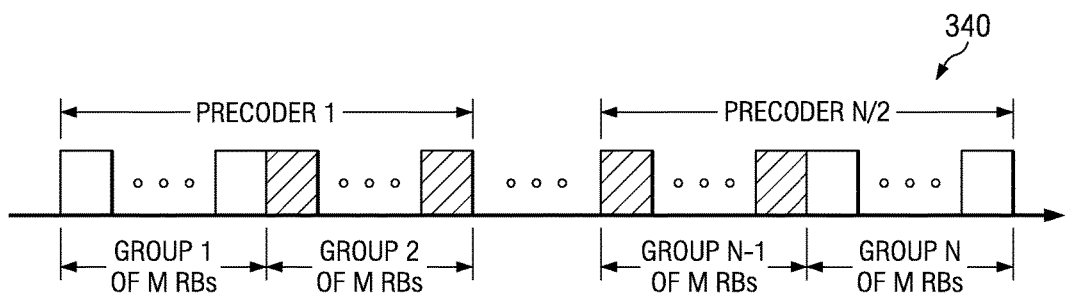
FIG. 3C illustrates a diagram of a grouping of resource blocks as provided by another embodiment of the present invention.

FIGS. 3A, 3B and 3C illustrate generalized alternative embodiments for pre-coder selection. The resource blocks shown are idealized representations of the resource blocks shown in FIG. 2, for simplicity of illustration.

FIG. 3A illustrates a diagram of a more generalized grouping of resource blocks 300 corresponding to the exemplary grouping of FIG. 2. Again, each group of contiguous resource blocks has a single pre-coder selected for the group. The resource block grouping 300 corresponds to N groups of M frequency-domain resource blocks, which represent a total of NM resource blocks for a channel. The single pre-coder matrix is selected for each of the N groups wherein the single pre-coder is selected with respect to all of the M resource blocks in the group. For example, the pre-coder selected may provide a maximum sum throughput across all resource blocks within each group. Feedback employs a preferred pre-coding matrix/vector for each group. That is, only one pre-coder selection feedback is sent to the transmitter for each group of M frequency-domain resource blocks. The total feedback in bits may be represented by NB where each of the N pre-coders employs B bits of feedback indicator (B=$\lceil \log_2 S_{PRE} \rceil$) where $S_{PRE}$ is the codebook size (the number of possible pre-coding matrices). Note that these feedback bits are typically protected with some coding scheme and the NB feedback bits can be jointly encoded.

FIG. 3B illustrates a diagram of a grouping of resource blocks 320 as provided by an alternative embodiment of the present invention. The resource block grouping 320 employs a pre-coder selection that provides a set of pre-coders corresponding to a subgroup of resource blocks contained in each group of contiguous resource blocks. The resource block grouping 320 corresponds to N' groups of M' resource blocks that represent a total of N'M' resource blocks for a channel. An advantage of this embodiment over that of FIG. 3A is that the group size may typically be increased to gain pre-coding efficiency.

This embodiment is group-based and provides the best L out of M' pre-coders, where 1≤L<M'. The L pre-coders are selected for each of the N' resource groups. Each of the L pre-coders is selected with respect to one of the M' resource blocks that satisfies a certain optimality criterion. For example, if a maximum throughput per resource block is chosen, the L pre-coders are picked that correspond the L resource blocks with maximum throughput. In this example, an L equal to one is indicated in FIG. 3B.

Feedback employs L preferred pre-coding matrices or vectors for each group, and pointers are employed to the best L resource blocks for each group. The total feedback indicator in bits employing S bits per pre-coder may be represented by equation (1) below:

$$\left( N'B + N'\log_2 \binom{M'}{L} \right) \quad (1)$$

These feedback bits can be jointly encoded.

FIG. 3C illustrates a diagram of a grouping of resource blocks 340 as provided by another embodiment of the present invention. The resource block grouping 340 employs a pre-coder selection that provides a set of pre-coders corresponding to a combination of groups of contiguous resource blocks. The resource block grouping 340 corresponds to N groups of M resource blocks that represent a total of NM resource blocks for a channel. The N groups are farther partitioned into N/M' "super-groups". An advantage of this embodiment over those of FIGS. 3A and 3B is that a further reduction in feedback may be achieved although performance may suffer.

This embodiment provides the best L out of M' pre-coders across an N/M' combination of groups (i.e., super-groups). The L pre-coders are selected for each of these super-groups. Each of the pre-coders is selected with respect to one group that satisfies a certain optimality criterion. For example, a maximum sum (group) throughput across super-groups may be employed wherein L pre-coders are selected that correspond to the L groups with maximum throughput. In this example, a super-group size M' equal to two and an L equal to one is shown in FIG. 3C.

Feedback employs a preferred pre-coding matrix/vector for each group, and pointers are employed to the best l groups for each super-group. The total feedback in bits employing B bits per pre-coder may be represented by equation (2) below:

$$\left( \frac{N}{M'} B + \frac{N}{M'} \log_2 \binom{M'}{L} \right) \quad (2)$$

Again, these feedback bits can be jointly encoded. Of course, in each of the embodiments of FIGS. 3A, 3B and 3C, other optimality criteria may be applied such as a worst case throughput or a specified maximum error rate, for example.

Figure 4:
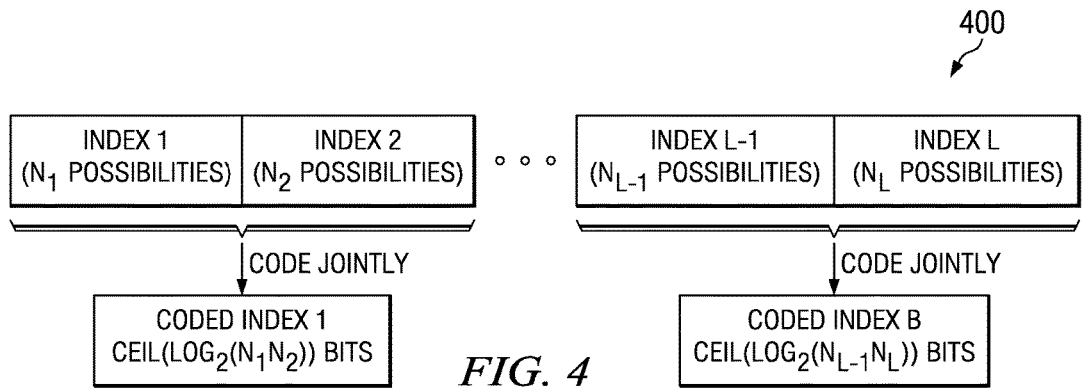
FIG. 4 illustrates a diagram of an embodiment of a pre-coder selection that is jointly coded to achieve feedback transmission compression.

FIG. 4 illustrates a diagram of an embodiment of a pre-coder selection 400 that is jointly encoded to achieve feedback transmission compression. The pre-coder selection 400 includes L pre-coder indices that comprise a pre-coder selection. For each pre-coder grouping scheme, a joint coding scheme may be employed for a collection of pre-coder indices that is uniquely specified employing a total number of bits to jointly code the indices.

For example, assume that four pre-coder indices are fed back wherein each of them is drawn from a set of three possibilities (that is, the codebook size of 3). The upper limit needed is, of course, eight bits. However, if this information is compressed together, there are only $3^4$ or 81 possibilities. This may be represented by seven bits. There are no two bits that represent each of the pre-coders directly, and the entire seven bits need to be decoded to determine the pre-coder information. However, compression of the feedback information is advantageously achieved. In general, this embodiment is advantageous not only when the codebook size is not a power of 2, but also in providing improved protection due to a more powerful coding. In addition, if a cyclic redundancy code (CRC) check is used, encoding over a larger number of bits reduces the overhead due to the CRC parity bits.

FIG. 5A illustrates a flow diagram of an embodiment of a method 500 of operating a receiver carried out according to principles of the present invention. In the illustrated embodiment, the method 500 is for a receiver that operates in an OFDM or an OFDMA system and starts in a step 505. Then, in a step 510, channel estimates are provided employing transmission signals (e.g., reference or pilot signals) from a transmitter having a plurality of antennas. The channel estimates allow channel quality indicators to be determined for frequency-domain resource blocks that form a communications channel. As mentioned before, an example of channel quality indicators are signal to interference noise ratios (SINR) and mutual information.

A pre-coder selection is generated that is based on the channel estimates and corresponds to a grouping of frequency-domain resource blocks, in a step 515. In the illustrated embodiment, the pre-coder selection provides a single pre-coder for each group of contiguous resource blocks. Alternatively, the pre-coder selection may provide a set of pre-coders corresponding to a subgroup of resource blocks contained in each group of contiguous resource blocks or a set of pre-coders corresponding to a combination of groups of contiguous resource blocks.

The pre-coder selection is based on an optimality criterion such as the sum throughput for the grouping of resource blocks that it represents, a worst case throughput, or a specified maximum error rate. Additionally, the pre-coder selection may be based on a grouping of the resource blocks that is variable or fixed depending on a level of signaling support provided.

The pre-coder selection for data transmission to the receiver is fed back to the transmitter in a step 520. The pre-coder selection is jointly coded to achieve feedback transmission compression. The channel quality indicators are also fed back to the transmitter in the step 520. The method 500 ends in a step 525.

FIG. 5B illustrates a flow diagram of an embodiment of a method 550 of operating a transmitter having a plurality of antennas carried out according to the principles of the present invention. In the illustrated embodiment, the method 550 is for a transmitter that operates in an OFDM or an OFDMA system and starts in a step 555. Then, in a step 560, the transmitter provides a capability of applying pre-coding to a data transmission for a receiver. Pre-coding allows the data transmission to be efficiently applied to the receiver based on channel quality indicators (such as a signal to interference noise ratio) that are obtained from the receiver.

The pre-coder selection for the data transmission is decoded in a step 565. The pre-coder selection in the step 565 is fed back from the receiver and corresponds to a grouping of frequency-domain resource blocks employed by the receiver. In one embodiment, the pre-coder selection is jointly coded in the feedback to achieve feedback compression from the receiver.

In one embodiment, the receiver may provide the pre-coder selection as a single pre-coder for each group of contiguous resource blocks. Alternatively, the pre-coder selection may be provided as a set of pre-coders corresponding to a subgroup of resource blocks contained in each group of contiguous resource blocks or as a set of pre-coders corresponding to a combination of groups of contiguous resource blocks.

Additionally, the grouping of the resource blocks may be either variable or fixed based on signaling support provided between the transmitter and the receiver. In each of these cases, the pre-coder may be based on a sum throughput, a worst case throughput or a specified maximum error rate required for each of resource blocks. The pre-coder selection is applied to the data transmission to the receiver in a step 570 and the method 550 ends in a step 575.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

For instance, all the pre-coder selection feedback bits corresponding to the techniques given in this invention can also be jointly encoded with the channel quality indicator (CQI) bits to achieve further compression and coding efficiency. It is further possible to jointly encode the two combinations with at least one other receiver feedback such as rank selection and/or ACK-NAK feedback. It is further possible to separately encode the rank selection feedback bits with the jointly encoded CQI plus pre-coder selection bits where the rank selection feedback information serves as the codeword size indicator of the jointly encoded CQI plus pre-coder selection information.

While the above embodiments are given in the context of an OFDM/OFDMA system, it is also possible to apply the techniques taught in this invention to some other data modulation or multiple access schemes that utilize some type of frequency-domain multiplexing. Some examples include but are not limited to the classical frequency-domain multiple access (FDMA), single-carrier FDMA (SC-FDMA), and multi-carrier code division multiple access (MC-CDMA).

Those skilled in the art to which the invention relates will appreciate that other and further additions, deletions, substitutions and modifications may be made to the described embodiments without departing from the scope of the invention.

What is claimed is:

1. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection provides a single pre-coder for each group of contiguous resource blocks and corresponds to a grouping of frequency-domain resource blocks.

2. The receiver as recited in claim 1 wherein a number of contiguous resource blocks corresponding to each group is varied and configured by the transmitter employing signaling to the receiver via a broadcast or a common control channel.

3. The receiver as recited in claim 1 wherein a number of contiguous resource blocks corresponding to each group is varied and configured by a network employing signaling to the receiver via a higher layer signaling.

4. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection provides a set of pre-coders corresponding to a subgroup of resource blocks contained in each group of contiguous resource blocks and corresponds to a grouping of frequency-domain resource blocks.

5. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection provides a set of pre-coders corresponding to a combination of groups of contiguous resource blocks and corresponds to a grouping of frequency-domain resource blocks.

6. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection is jointly encoded to achieve feedback transmission compression and corresponds to a grouping of frequency-domain resource blocks.

7. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection is jointly encoded with a channel quality indicator and corresponds to a grouping of frequency-domain resource blocks.

8. A method of operating a receiver, comprising:
providing channel estimates employing transmission signals from a transmitter having multiple antennas; and
feeding back a pre-coder selection for data transmission to the transmitter that is based on the channel estimates, wherein the pre-coder selection corresponds to a grouping of frequency-domain resource blocks and provides a single pre-coder for each group of contiguous resource blocks.

9. The method as recited in claim 8 wherein a number of contiguous resource blocks corresponding to each group is varied and configured by the transmitter employing signaling to the receiver via a broadcast or a common control channel.

10. The method as recited in claim 8 wherein a number of contiguous resource blocks corresponding to each group is varied and configured by a network employing signaling to the receiver via a higher layer signaling.

11. A method of operating a receiver, comprising:
providing channel estimates employing transmission signals from a transmitter having multiple antennas; and
feeding back a pre-coder selection for data transmission to the transmitter that is based on the channel estimates, wherein the pre-coder selection provides a set of pre-coders corresponding to a subgroup of resource blocks contained in each group of contiguous resource blocks and corresponds to a grouping of frequency-domain resource blocks.

12. A method of operating a receiver, comprising:
providing channel estimates employing transmission signals from a transmitter having multiple antennas; and
feeding back a pre-coder selection for data transmission to the transmitter that is based on the channel estimates, wherein the pre-coder selection provides a set of pre-coders corresponding to a combination of groups of contiguous resource blocks and corresponds to a grouping of frequency-domain resource blocks.

13. A method of operating a receiver, comprising:
providing channel estimates employing transmission signals from a transmitter having multiple antennas; and
feeding back a pre-coder selection for data transmission to the transmitter that is based on the channel estimates, wherein the pre-coder selection is jointly encoded to achieve feedback transmission compression and corresponds to a grouping of frequency-domain resource blocks.

14. A method of operating a receiver, comprising:
providing channel estimates employing transmission signals from a transmitter having multiple antennas; and
feeding back a pre-coder selection for data transmission to the transmitter that is based on the channel estimates, wherein the pre-coder selection is jointly encoded with a channel quality indicator and corresponds to a grouping of frequency-domain resource blocks.

15. A receiver, comprising:
a receive portion employing transmission signals from a transmitter having multiple antennas and capable of providing channel estimates; and a feedback generator portion configured to provide a pre-coder selection for data transmission to the transmitter that is based on the channel estimates, wherein the pre-coder selection corresponds to a grouping of frequency-domain resource blocks, wherein each of the resource blocks represents 180kHz bandwidth.

16. The receiver as recited in claim 15, wherein each of the resource blocks represents 180kHz bandwidth comprising 12 OFDM/OFDMA sub-carriers.

17. The receiver as recited in claim 16, wherein each of the resource blocks represents 180kHz bandwidth comprising 12 OFDM/OFDMA sub-carriers thereby giving a group size of 900 kHZ for each of first, second and third pre-coders selected.

18. A receiver, comprising:
a receive portion employing transmission signals from a transmitter having multiple antennas and capable of providing channel estimates; and
a feedback generator portion configured to provide a pre-coder selection for data transmission to the transmitter that is based on the channel estimates, wherein the pre-coder selection corresponds to a grouping of frequency-domain resource blocks, wherein each of the resource blocks represents 180kHz bandwidth.

19. The receiver as recited in claim 18, wherein each of the resource blocks represents 180kHz bandwidth comprising 12 OFDM/OFDMA sub-carriers.

20. The method as recited in claim 19, wherein each of the resource blocks represents 180kHz bandwidth comprising 12 OFDM/OFDMA sub-carriers thereby giving a group size of 900 kHZ for each of first, second and third pre-coders selected.

* * * * *